United States Patent Office 3,341,567
Patented Sept. 12, 1967

3,341,567
PROCESS FOR THE PRODUCTION OF BENZENEDICARBOXYLIC ACID AND ALIPHATIC DINITRILE BY EXCHANGING CARBOXYLIC GROUP FOR CYANO GROUP
Teruo Yasui and Hiromichi Kohara, Kurashiki, Japan, assignors to Kurashiki Rayon Company Limited, Kurashiki, Japan, a corporation of Japan
No Drawing. Filed Jan. 22, 1965, Ser. No. 427,460
Claims priority, application Japan, Feb. 14, 1964, 39/7,553
4 Claims. (Cl. 260—465.8)

---

ABSTRACT OF THE DISCLOSURE

A process for the production of a benzenedicarboxylic acid and an aliphatic dinitrile which comprises heating a benzenedinitrile and an aliphatic dicarboxylic acid to produce a benzenedicarboxylic acid and an aliphatic dinitrile.

---

This invention relates to a process for the production of carboxylic acid and nitrile by exchanging carboxylic group and cyano group and more particularly, for the production of benzenedicarboxylic acid and aliphatic dinitrile.

That is to say, in accordance with the present invention, benzenedicarboxylic acid and aliphatic dinitrile can be manufactured by heating benzenedinitrile and aliphatic dicarboxylic acid at a temperature of 200–300° C., thereby exchanging carboxylic group and cyano group.

This is expressed by the following general formula:

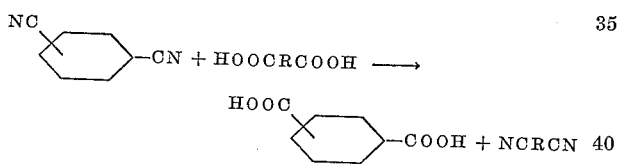

in which R is an aliphatic containing no substituent which is reactive with a —CN group and a —COOH group.

In general, a —CN group is obtained from a —COOH group by the following reaction:

$$RCOOH + NH_3 \rightarrow RCN + 2H_2O$$

This dehydration reaction may be carried out in a liquid phase or in a vapor phase. For the dehydration in a liquid phase, as a dehydrating agent is used $P_2O_5$ or $H_2SO_4$ and in a vapor phase, the reaction is carried out at a high temperature, as occasion demands, in the presence of a catalyst. In both cases, however, the yield is not satisfactory and moreover it requires chemical such as $P_2O_5$ and $H_2SO_4$. There is another process for obtaining —CN group by reacting alkyl halide with hydrocyanic acid or its salt, but in this case, the yield is poor.

On the other hand, in the production of carboxylic acid, there is known a process involving hydrolysis of —CN group and a process involving direct oxidation of hydrocarbon wherein oxygen and an oxidizing agent are used in liquid and vapor phases. In the direct oxidation, the yield is not so good and in the hydrolysis of —CN group, an acid is required for removing $NH_3$ as a by-product, resulting in uneconomical disadvantage.

In spite of the fact that —CN group and —COOH group can be converted from one to the other, such processes have encountered various difficulties in an economical point of view, because they must be conducted through several processing steps, for which chemicals and apparatus are required.

The inventers have paid attention to the fact that —CN group reacts with —COOH group as follows:

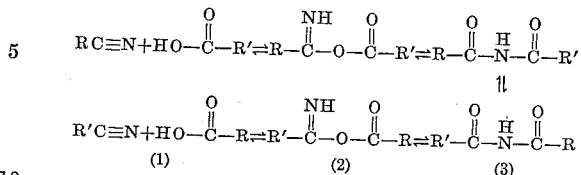

and —CN group and —COOH group are theoretically exchangeable with each other through (3), and have found that the reaction can be accomplished by the driving force caused by taking the product out of the system.

Illustrative of benzenedinitriles used in the process of the invention are phthalonitrile, isophthalonitrile and terephthalonitrile, and illustrative of aliphatic dicarboxylic acids used in the invention are, for example, malonic acid, succinic acid, glutaric acid, adipic acid, pimelic acid, suberic acid, azelaic acid, sebacic acid, maleic acid and glutaconic acid. The first eight of these acids may be defined by the formula $HOOC(CH_2)_mCOOH$, where $m = 1-8$ and the last two acids may be defined by the formula $$H-C-COOH$$
$$\parallel$$
$$H-C-(CH_2)_{n-1}COOH$$

where $n = 1$ or $2$.

The invention is illustrated further in detail by the following description. At first, benzenedinitrile is mixed with aliphatic dicarboxylic acid in a suitable proportion, and the mixture is heated at a temperature of 200–300° C., preferably 240–260° C. for 10–100 minutes, preferably 30–50 minutes. If the temperature is lower than 200° C., the reaction rate is lower, and if the temperature is higher than 300° C., the reaction product is colored deep black and the yield becomes poor. As the reaction reaches an equilibrium state at 250° C. in about 20–30 minutes, further heating is insignificant. During the latter half of the reaction, benzenedicarboxylic acid is precipitated in the mixed solution. As a result in the process of the invention, the exchange reaction of cyano group and carboxyl group proceeds so that benzenedicarboxylic acid and aliphatic dinitrile may be formed. After the reaction has completed, the resulting aliphatic dinitrile can be taken out by distillation under reduced pressure.

In order to accelerate the reaction, the temperature must be raised to some extent and a catalyst is required. After various experiments the inventors have found that a reaction temperature higher than 200° C. is preferable. However, it is important for the purpose of carrying out the process efficiently and at high yield to keep the reaction temperature within 200–300° C. by using an inert gas such as nitrogen or carbon dioxide under a pressure or a reduced pressure, since a carbonization reaction and side reaction occur at a temperature higher than that. As the catalyst suitable for carrying out the invention smoothly, inorganic acids such as hydrochloric acid, nitric acid, sulfuric acid, phosphoric acid, boric acid, carbonic acid, sulfurous acid and phosphorus acid, and organic acids such as organo sulfonic acid and their acidic salts. For sulfuric acid, for example, sodium bisulfate, ammonium bisulfate, ammonium sulfate, etc. are preferred. The amount of the catalyst to be used may very with the reaction conditions and reaction materials, but 0.05 to 5% by weight, in particular, 0.1 to 1% by weight is preferable.

The principal object of the invention is to produce benzenedicarboxylic acid and aliphatic dinitrile efficiently at lower cost.

In order to carry out the reaction smoothly, it is necessary to maintain the reaction mixture in a thoroughly mixed state to form a uniform liquid phase. For this purpose, a large amount of starting material having a lower boiling point is employed, to which another material is gradually added. When readily decomposable materials are reacted, a similar precaution must be employed. Of course, a suitable solvent is preferably used or may be used for carrying out the reaction smoothly and maintaining the temperature constant. Furthermore, some carboxylic acids and nitriles have sublimating properties and tend to adhere to the upper part of the wall of a reaction vessel, which results in interrupting the smooth progress of the reaction. In order to overcome such disadvantages, it is necessary to use a small amount of a solvent. As such solvent, any solvent may be used if it is not reactive with —CN group and —COOH group or it has a low boiling point and is not present in the reaction melt at the reaction temperature even though it has some interchangeability with —CN group and —COOH group. It must have, of course, a property of dissolving starting materials for the reaction. Illustrative of such solvents are lower fatty acids such as acetic acid and propionic acid, lower nitriles such as acetonitrile and propionitrile, dioxane, methyl ethyl ketone, ethyl benzoate, benzene, cyclohexane, cyclohexanone, cyclopentanone, toluene, hexane and biphenyl ether. The amount of the solvent to be added is preferably adjusted to less than 10% of the mixture.

The process of the invention is particularly valuable when terephthalonitrile and adipic acid are used as reactants. Terephthalonitrile and adipic acid are converted into terephthalic acid and adiponitrile through the exchange of the —CN group and —COOH group. As is widely known, terephthalic acid is used for the starting material of synthesis of polyesters and adiponitrile is hydrogenated to hexamethylenediamine which is used for the starting material of synthesis of polyamides. Adiponitrile is ordinarily produced by reaction between adipic acid and ammonia, and terephthalic acid is usually produced by the liquid phase oxidation of p-xylene. However, according to the process of the invention, both can be obtained in one step and therefore, the process and apparatus can be simplified and has great merit in that they are inexpensive.

If the proportion of —CN groups and —COOH groups to be introduced firstly is suitably changed and —CN groups are increased, a larger amount of adiponitrile is produced while terephthalic acid is hardly produced. In this case, adiponitrile is produced in the first step and to the monosubstituted mixture from which adiponitrile has been previously removed is added adipic acid to provide terephthalic acid. The monosubstituent

may be withdrawn on the way, because it can be converted into

used as a monomer of polyamide through hydrogenation.

The invention will be further explained in detail by the following examples.

EXAMPLE 1

25.0 g. of terephthalonitrile, 28.5 g. of adipic acid (mole ratio 1:1) and 2 cc. of cyclopentanone were charged into a flask equipped with a reflux condenser and a stirrer and the flask was immersed in an oil bath at 270° C. for 45 minutes. The analysis of the reaction product showed it comprised 6.35 g. of adiponitrile, 10.80 g. of adipic acid mononitrile, 0.15 g. of adipic acid, 0.51 g. of adipic acid, 0.51 g. of phthalonitrile, 9.93 g. of terephthalic acid mononitrile, 18.90 g. of terephthalic acid. The yield of adiponitrile was 43.5% and the yield of terephthalic acid was 58.5%. The material balance before and after the reaction was: aromatic compound 96.4%, aliphatic compound 87.5%, —COOH group 98.5% and —CN group 85.2%.

EXAMPLE 2

4.38 g. of terephthalonitrile, 1.0 g. of adipic acid (CN/COOH mole ratio 5:1), 0.6 ml. of cyclopentanone and 0.027 g. of NaHPO₃ as catalyst were charged into a reactor equipped with a reflux condenser and substituted with nitrogen and heated at 250° C. for 1 hour. The analysis of the product showed that the yield of adiponitrile was 78.4% and the yield of terephthalic acid was 0.2%. This example shows that the increase in the amount of —CN group results in the formation of a large amount of adiponitrile.

EXAMPLE 3

An equi-molar mixture of terephthalonitrile and adipic acid was heated to a reaction temperature of 320° C., the temperature of the outlet of reactor being 290–295° C., to give liquid and solid reaction products at room temperature. They were identified as adiponitrile, monocyanoadipic acid and a cyclic ketone by infra-red absorption spectrograph, alkali titration and elementary analysis.

EXAMPLE 4

1.00 g. of terephthalonitrile, 4.60 g. of adipic acid (CN/COOH mole ratio 1:4) and 0.3 ml. of acetic acid were charged into a reactor equipped with a reflux condenser and the mixture was heated at 280° C. for 30 minutes to provide 1.07 g. of terephthalic acid (82.5% for terephthalonitrile) and 0.06 g. of adiponitrile (2% based on adipic acid).

EXAMPLE 5

6.4 g. of isophthalonitrile and 5.9 g. of succinic acid were mixed with 0.6 ml. of cyclopentanone and the mixture was charged into a flask equipped with a reflux condenser. The flask was heated in an oil bath at 235° C. for 40 minutes. The reaction product was washed with methanol and contained 5.0 g. of isophthalic acid. 2.1 g. of ethylene dicyanide was detected in the methanol by the gas chromatography.

EXAMPLE 6

2.0 g. of terephthalonitrile and 2.3 g. of adipic acid were mixed with 0.02 g. of phosphoric acid as catalyst and heated at 250° C. for 30 minutes to provide 1.05 g. of terephthalic acid.

EXAMPLE 7

10.0 g. of isophthalonitrile, 11.5 g. of adipic acid and 0.7 cc. of cyclohexanone were charged into a flask equipped with a reflux condenser and the flask was maintained in an oil bath at 275° C. for 35 minutes with stirring and obtained 9.5 g. of isophthalic acid and 3.4 g. of adiponitrile as found from the analysis after the reaction.

EXAMPLE 8

10.0 g. of orthophthalonitrile, 12 g. of adipic acid and 0.5 cc. of cyclohexanone were reacted in the similar method as above to obtain 8.5 g. of phthalic acid and 3.2 g. of adiponitrile.

EXAMPLE 9

To an equi-molar mixture of isophthalonitrile and glutaconic acid (HOOC—CH₂CH=CHCOOH) were added 0.1% by weight of ammonium sulfate as a catalyst and 0.05% by weight of hydroquinone as a polymerization inhibitor and the mixture was heated to a reaction temperature of 200° C. under a reduced pressure of 100 mm. Hg, the temperature of the outlet of reactor being 180° C., to give the corresponding nitrile

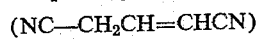

having a melting point of 29.1° C. (31.5° C. by the literatures).

What we claim is:

1. A process for the production of a benzenedicarboxylic acid and an aliphatic dinitrile which comprises heating a benzenedinitrile and an aliphatic dicarboxylic acid having the formula (A) $HOOC(CH_2)_mCOOH$, where $m=1-8$ or (B)
$$\begin{array}{l} H-C-COOH \\ \parallel \\ H-C-(CH_2)_{n-1}COOH \end{array}$$

where $n=1$ or $2$ at a temperature of 200–300° C. for 10–100 minutes to obtain benzenedicarboxylic acid and corresponding aliphatic dinitrile.

2. A process according to claim 1, wherein the benzenedinitrile and the aliphatic dicarboxylic acid are heated in the presence of a solvent consisting of acetic acid, propionic acid, acetonitrile, propionitrile, dioxane, methyl ethyl ketone, ethyl benzoate, benzene, cyclohexane, cyclohexanone, cyclopentanone, toluene, hexane or biphenyl ether.

3. A process according to claim 1, wherein the benzenedinitrile and aliphatic dicarboxylic acid are heated in the presence of 0.05 to 5% by weight an acidic catalyst which is an inorganic acid, an organo sulfonic acid or a salt thereof.

4. A process according to claim 1, wherein the benzenedinitrile is terephthalonitrile, and the aliphatic dicarboxylic acid is adipic acid.

References Cited

UNITED STATES PATENTS 2,377,795  6/1945  Loder _____ 260—465.8

JOSEPH P. BRUST, *Primary Examiner*.